(12) United States Patent
Hermann et al.

(10) Patent No.: US 11,582,915 B2
(45) Date of Patent: Feb. 21, 2023

(54) COMBINE HARVESTER AND METHOD OF CONTROLLING A COMBINE HARVESTER

(71) Applicant: AGCO International GmbH, Neuhausen (CH)

(72) Inventors: Dan Hermann, Randers (DK); Morten Leth Bilde, Langaa (DK)

(73) Assignee: AGCO International GmbH, Duluth, GA (US)

( * ) Notice: Subject to any disclaimer, the term of this patent is extended or adjusted under 35 U.S.C. 154(b) by 576 days.

(21) Appl. No.: 16/719,032

(22) Filed: Dec. 18, 2019

(65) Prior Publication Data
US 2020/0196531 A1    Jun. 25, 2020

(30) Foreign Application Priority Data

Dec. 19, 2018 (GB) ...................................... 1820715

(51) Int. Cl.
*A01F 12/44* (2006.01)
*A01D 41/127* (2006.01)
*A01F 12/32* (2006.01)
*A01F 12/48* (2006.01)

(52) U.S. Cl.
CPC ........ *A01F 12/444* (2013.01); *A01D 41/1272* (2013.01); *A01D 41/1276* (2013.01); *A01F 12/32* (2013.01); *A01F 12/446* (2013.01); *A01F 12/48* (2013.01)

(58) Field of Classification Search
CPC ...... A01F 12/444; A01F 12/32; A01F 12/446; A01F 12/48; A01D 41/1272; A01D 41/1276
See application file for complete search history.

(56) References Cited

U.S. PATENT DOCUMENTS

| | | | | |
|---|---|---|---|---|
| 4,259,829 A | * | 4/1981 | Strubbe | A01D 41/1276 56/DIG. 15 |
| 6,242,927 B1 | * | 6/2001 | Adams | G01N 27/223 324/663 |
| 7,846,013 B1 | * | 12/2010 | Diekhans | A01D 41/1276 460/1 |

(Continued)

FOREIGN PATENT DOCUMENTS

| | | | | |
|---|---|---|---|---|
| DE | 10329932 A1 | * | 2/2005 | ........... A01D 41/127 |
| DE | 102016203079 A1 | * | 9/2017 | ......... A01D 41/1272 |

(Continued)

OTHER PUBLICATIONS

UK Intellectual Property Office, Search Report for Related UK Application No. GB1820715.9, dated Jun. 19, 2019.

*Primary Examiner* — Arpad F Kovacs

(57) ABSTRACT

A combine harvester includes threshing apparatus, separating apparatus, a grain cleaning system located downstream of the separating apparatus, and a material conveyance system arranged to convey crop material from the separating apparatus to the grain cleaning system. The grain cleaning system includes screening apparatus, a fan arranged to generate a cleaning airstream through the screening apparatus, and a fan control system configured to control a fan speed. The fan control system includes a proximity sensor mounted above the material conveyance system for sensing a material volume. The fan control system controls the fan speed in dependence upon the material volume.

8 Claims, 4 Drawing Sheets

(56) References Cited

U.S. PATENT DOCUMENTS

| | | | | |
|---|---|---|---|---|
| 2016/0198629 A1* | 7/2016 | Duquesne | ............ | A01F 12/446 |
| | | | | 701/36 |
| 2017/0090445 A1* | 3/2017 | French, Jr. | ............ | B60W 30/00 |
| 2017/0150680 A1 | 6/2017 | Moutton | | |
| 2022/0132736 A1* | 5/2022 | Meyers | ................ | A01F 12/444 |
| | | | | 460/7 |

FOREIGN PATENT DOCUMENTS

| | | | | |
|---|---|---|---|---|
| EP | 1491082 A1 * | 12/2004 | ............ | A01D 41/12 |
| EP | 1543712 A1 * | 6/2005 | ......... | A01D 41/1276 |
| EP | 2042019 A2 * | 4/2009 | .......... | A01D 41/127 |
| EP | 2476304 A1 * | 7/2012 | .......... | A01D 75/282 |
| EP | 3446559 A1 * | 2/2019 | ........ | A01D 41/1272 |
| EP | 3566563 A1 * | 11/2019 | .......... | A01D 41/127 |
| GB | 2014025 A * | 8/1979 | ........ | A01D 41/1276 |
| JP | H09257535 A | 10/1997 | | |
| JP | H11155349 A | 2/1999 | | |
| JP | 2009055804 A | 3/2009 | | |
| JP | 2012205574 A | 10/2012 | | |
| JP | 2017000087 A | 1/2017 | | |
| WO | WO-2017162624 A1 * | 9/2017 | ............ | A01F 12/44 |

* cited by examiner

COMBINE HARVESTER AND METHOD OF CONTROLLING A COMBINE HARVESTER

CROSS-REFERENCE TO RELATED APPLICATIONS

This application claims the benefit of the filing date of United Kingdom Patent Application GB1820715.9, "Combine Harvester and Method of Controlling Such," filed Dec. 19, 2018, the entire disclosure of which is incorporated herein by reference.

FIELD

This disclosure relates to combine harvesters having threshing apparatus, separating apparatus, a grain cleaning system located downstream of the separating apparatus, and a material conveyance system arranged to convey crop material from the separating apparatus to the grain cleaning system, wherein the grain cleaning system comprises screening apparatus, a fan arranged to generate a cleaning airstream through the screening apparatus, and a fan control system configured to control a fan speed. The disclosure also relates to a method of controlling a combine harvester having a grain cleaning system.

BACKGROUND

The process of harvesting grain from crop fields has not changed substantially for many decades. Farmers use combine harvesters to cut a standing crop, thresh the crop material, separate the grain from the stem, and clean the grain while returning the crop material residue onto the field. Typically, combine harvesters include threshing apparatus, separating apparatus, and a grain cleaning system.

Grain cleaning systems use screening apparatus that typically include one or more sieves driven in an oscillating motion. A mixture of grain, chaff, unthreshed heads, and straw is delivered to an uppermost sieve, upon which the mixture is conveyed across the surface thereof. The chaff and straw may be referred to herein and in the art as 'MOG', meaning Material Other than Grain.

Generally speaking, clean grain finds its way down through the sieves to a collection trough. A fan is provided to generate a cleaning airstream through the cleaning apparatus. The cleaning airstream is directed through and/or over the sieves so as to lift and carry the MOG away from the surface of the sieves and eject the MOG from the cleaning system. The sieves are generally set up to screen the unthreshed heads which are 'returned' as tailings to a rethreshing system.

Today it is known to provide combines with control systems that automatically adjust settings of the various crop processing apparatus. Such "auto-setting" functionality relieves the operator of making manual adjustments to optimize the harvesting process, wherein the optimum settings continuously change as harvest conditions vary. However, for reliable auto-setting operation, an accurate representation of the current conditions within the various processing apparatus is required.

BRIEF SUMMARY

In some embodiments, a combine harvester includes threshing apparatus, separating apparatus, a grain cleaning system located downstream of the separating apparatus, and a material conveyance system arranged to convey crop material from the separating apparatus to the grain cleaning system, wherein the grain cleaning system comprises screening apparatus, a fan arranged to generate a cleaning airstream through the screening apparatus, and a fan control system configured to control a fan speed. The fan control system includes a proximity sensor mounted above the material conveyance system for sensing a material volume, and the fan control system controls the fan speed in dependence upon the material volume.

The material conveyance system includes a preparation pan disposed upstream of the screening apparatus and below the threshing apparatus. The preparation pan serves to deliver the mixture of grain and MOG to the cleaning system immediately upstream of the sieve or sieves. Through rearward conveyance of the grain and MOG mixture, a degree of stratification may occur wherein the grain sinks to the bottom and the MOG rises to the top.

The material conveyance system further includes a return pan positioned below the separating apparatus. The return pan serves to catch crop material that falls from the separating apparatus and convey the material in a forward direction to a front edge of the return pan, from which the material falls onto the preparation pan located below the front edge. The proximity sensor may be mounted to an underside of the return pan, preferably above the preparation pan. The return pan offers advantageous mounting means for the proximity sensor, especially when a front portion of the return pan overlaps a rear portion of the shoe preparation pan. By "looking" at a rear portion of the preparation pan, the material volume sensed is located at the 'point-of-delivery' immediately upstream of the grain cleaning system, thus providing an accurate representation of the immediate MOG load.

In other embodiments, a method of controlling a combine harvester includes sensing a material volume present on a material conveyance system and controlling a speed of a fan in dependence upon the material volume. The combine includes a plurality of working units including threshing apparatus, separating apparatus, a grain cleaning system located downstream of the separating apparatus, and the material conveyance system arranged to convey crop material from the separating apparatus to the grain cleaning system, wherein the grain cleaning system comprises screening apparatus and the fan arranged to generate a cleaning airstream through the screening apparatus.

A significant proportion of the material volume carried by the material conveyance system may be MOG, and the grain is relatively dense. The MOG load of the cleaning system may therefore be the most dominant parameter affecting grain loss. Advantageously, by measuring the volume of the material present on the material conveyance system, an accurate picture or estimation of the MOG load upon the cleaning system can be achieved, thus allowing for further optimization of automation algorithms. Such optimization may include, for example, optimizing control of the fan speed and/or sieve opening.

In an alternative embodiment, the proximity sensor is mounted above the screening apparatus for sensing the material volume present on the screening apparatus itself.

In yet another alternative embodiment, the proximity sensor is mounted above the return pan with the option of mounting the proximity sensor to an underside of the separating apparatus. Advantageously, this provides a measurement of the material volume on the return pan.

The fan control system preferably comprises a controller in communication with the proximity sensor, wherein the proximity sensor is configured to generate a first detection signal that is communicated to the controller, and wherein the controller is configured to determine a material volume value based upon the first detection signal.

Preferably, a yield sensor is provided wherein the yield sensor is in communication with the controller and configured to generate a second detection signal that represents a sensed grain material flow rate. The controller may be configured to determine the material volume value based upon an input from the proximity sensor and an input from the yield sensor so that the latter serves to compensate for the former.

BRIEF DESCRIPTION OF THE DRAWINGS

Further advantages will become apparent from reading the following description of specific embodiments with reference to the appended drawings in which.

DETAILED DESCRIPTION

Aspects of the disclosure will now be described in connection with various preferred embodiments implemented on a combine harvester. Relative terms such as front, rear, forward, rearward, left, right, longitudinal, and transverse will be made with reference to the longitudinal vehicle axis of the combine harvester travelling in the normal direction of travel. The terms "direction of conveyance," "upstream," and "downstream" are made with reference to the general flow of crop material through the combine harvester, or to the cleaning airstream through the screening apparatus.

Figure 1:
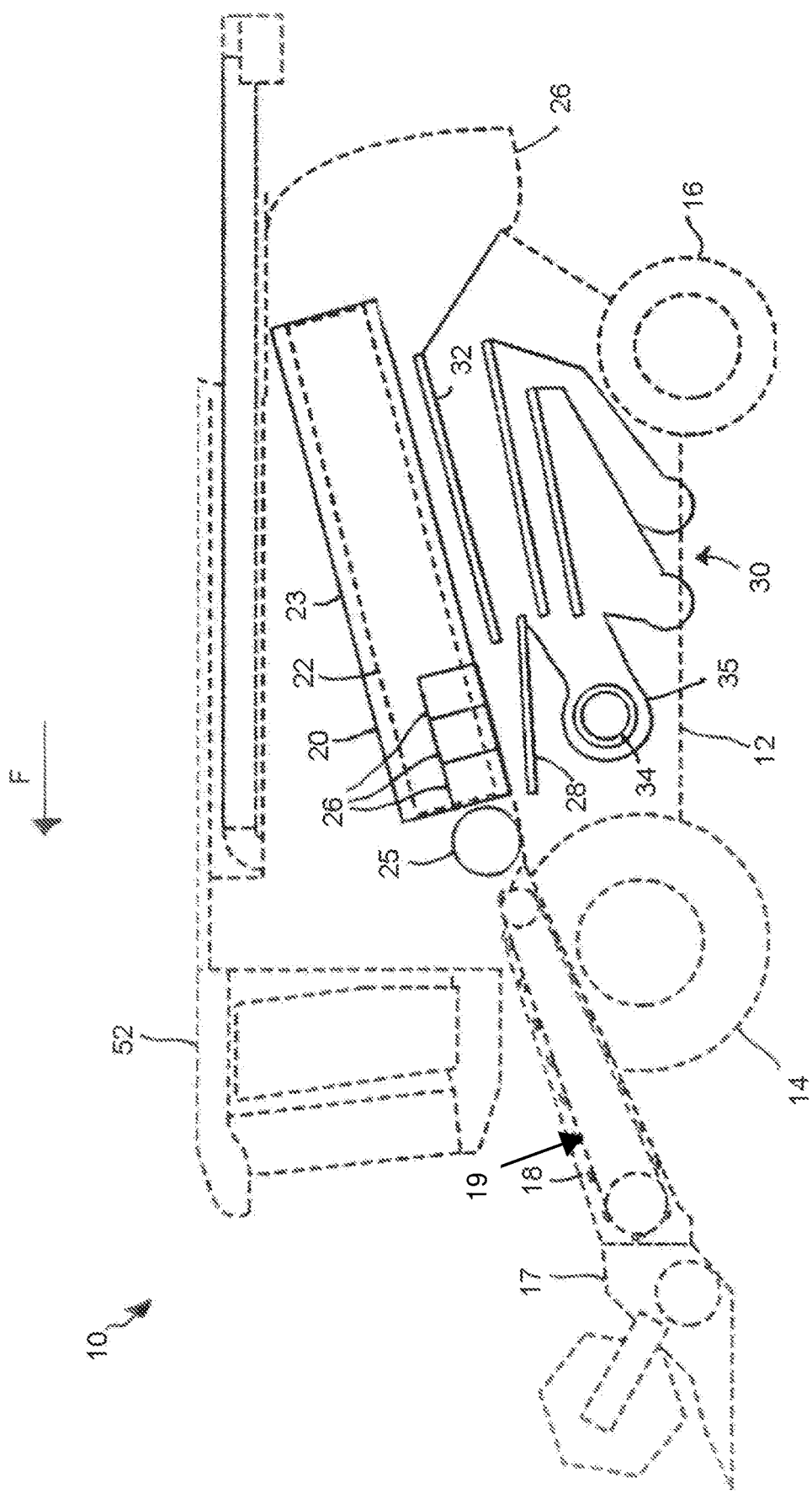
FIG. 1 is a schematic side elevation of a combine harvester, shown with the side panels removed to reveal the inside processing systems.

With reference to FIG. 1, a combine harvester 10 includes a frame or chassis 12, front wheels 14, and rear steerable wheels 16. A cutting header 17 is detachably supported on the front of a feederhouse 18, which is pivotable about a transverse axis to lift and lower the header 17 in a conventional manner.

The combine 10 is driven in a forward direction F across a field of standing crop in a known manner. The header 17 serves to cut and gather the crop material before conveying such into feederhouse 18 and elevator 19 housed therein. At this stage, the crop stream is unprocessed. It should be understood that combine harvesters are employed to harvest a host of different crops including cereal, rice, corn, and grass seed. The following description will make reference to various parts of the cereal crop stream, but it should be understood that this is by way of example only and does not by any means limit the applicability of the invention to harvester other harvesting crops.

The cut crop stream is conveyed rearwardly from the feederhouse 18 to a processor designated generally at 20. In the illustrated embodiment, the processor 20 is of the axial rotary type having a pair of axial-flow threshing and separating rotors 22, which are each housed side-by-side inside a respective rotor housing 23 and are fed at their front end by a feed beater 25. It should be appreciated that the right-hand rotor is hidden from view in FIG. 1. The rotors serve to thresh the crop stream in a front 'threshing' region, separate the grain therefrom in a rear 'separating' region, and eject the straw residue through the rear of the machine 27, either directly onto the ground in a windrow or via a straw chopper (not shown).

Each rotor housing 23 is generally cylindrical and is made up of an opaque upper section and a foraminous lower section which includes a set of side-by-side arcuate concave grate segments 26 extending the length of the front threshing region and which allow the threshed material to fall by gravity onto a shoe preparation pan 28 located below for onward conveyance to a grain cleaning system, designated generally at 30. Guide vanes (not shown) are secured to the inside of the rotor housing and serve, in conjunction with the crop engaging elements on the rotor 22, to convey the stream of crop material in a generally rearward spiral path from front to rear.

The separating region at the rear portion of rotors 22 comprises plural crop engaging elements (not shown) to separate the residual grain from the stream of crop material. A grain return pan 32 is provided underneath the separating region to collect the separated grain and convey it forward for delivery onto the grain collection pan 28. Both the shoe preparation pan 28 and return pan 32 are driven so as to oscillate in a known manner.

Although described as a rotary axial type, the processor 20 may be of an alternative type such as known conventional, hybrid or transverse types without departing from the scope of the invention. For example, in the case of a conventional type processor, a transverse cylindrical beater may be provided as threshing apparatus and a set of strawwalkers provided as separating apparatus.

Figure 2:
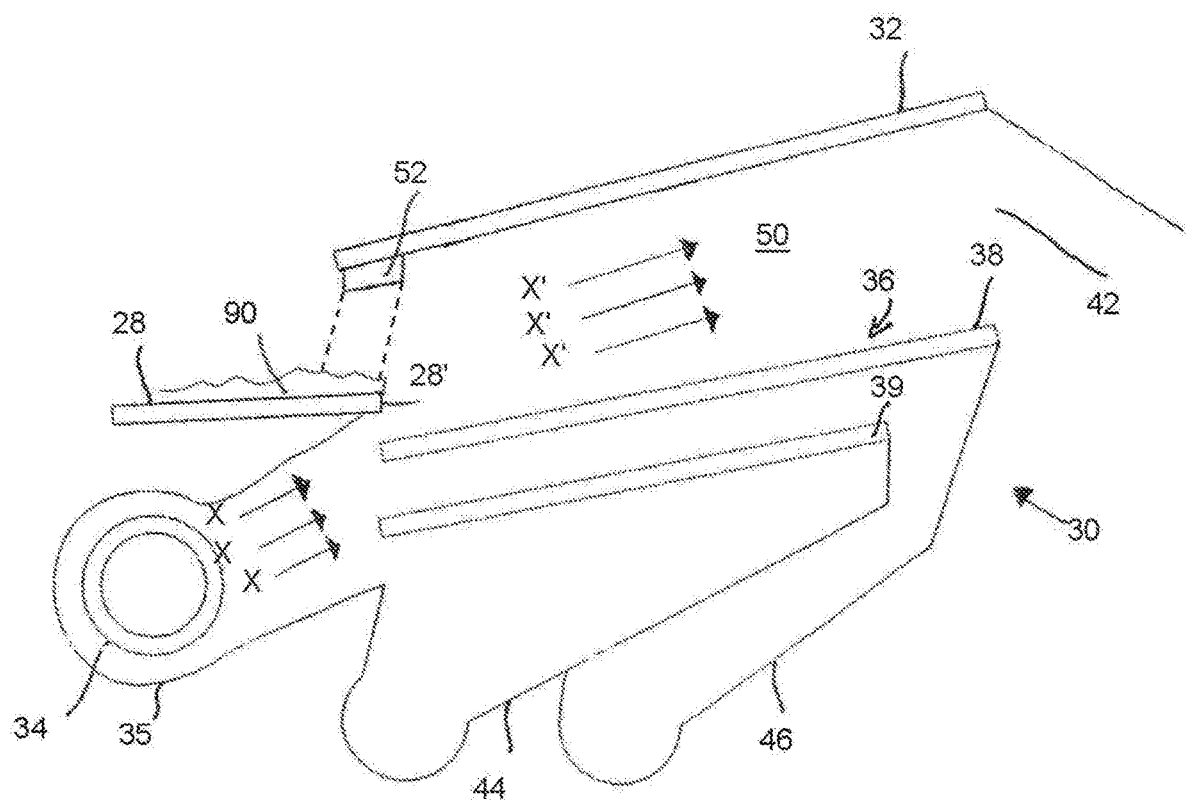
FIG. 2 is a schematic side view of the grain cleaning system in the combine harvester of FIG. 1.

With reference to FIGS. 1 and 2 the grain cleaning system 30 comprises a fan 34 housed in a fan housing 35. The fan 34 may be of a known type such as a crossflow or centrifugal fan that rotates on a transverse axis and draws in air either tangentially or axially through air intake openings. A cleaning airstream generated by the fan 34 and exhausted from the fan housing 35 is represented in FIG. 2 by arrows 'X'.

The fan 34 is driven by a fan drive system (not shown) which may derive its power via a mechanical drive coupled to the processor 20. Alternatively, the fan 34 may be driven by a hydraulic or electric motor. In any case, the fan drive system is operable to drive the fan 34 with an adjustable speed determined by a fan speed controller 134 (FIG. 3) that is in communication with the fan drive system.

The grain cleaning system 30 further comprises screening apparatus 36 which includes a shoe frame (not shown), upper sieve 38 (alternatively referenced 'chaffer') and a lower sieve 39. The sieves 38, 39 are driven with an oscillating motion in a known manner. The sieves 38, 39 are mounted between side members of the shoe frame, which is suspended on hangers (also not shown) from the frame 12 and driven in an oscillating motion.

The sieves 38, 39 each comprise a plurality of transverse louvers which can be adjusted either manually or remotely to adjust the coarseness of the screen provided. The louvers are arranged in a parallel transverse relationship and pivot to adjust the opening or gap between adjacent louvers.

The combine 10 comprises a pair of vertical sidewalls 40, 41 (FIG. 3) between which the shoe frame 37 and sieves 38, 39 are located. The sidewalls 40, 41 typically form part of the frame 12.

The threshed material comprising a mixture of grain and MOG is conveyed by the shoe preparation pan 28 in a rearward direction until it falls from a rear edge 28' and into the grain cleaning system 30. The cleaning airstream is directed through and over the sieves 38, 39 in a known manner so as to lift the lighter material, primarily MOG, away from the surface of upper sieve 38 and in a rearward direction for ejection at a rear outlet 42.

In a known manner, the screening apparatus 36 is operable to allow the clean grain to pass through the sieves 38, 39, wherein the clean grain is collected in a transverse clean grain trough 44 and conveyed onwards to an on-board grain tank (not shown). The louvers of the upper sieve 38 may be set to allow unthreshed heads to pass through a rear region of the upper sieve 38 into a tailings collection trough 46. Likewise, any material screened out by lower sieve 39 falls from the rear edge thereof into the tailings collection trough 46 from where the 'returns' are fed back to the processor 20 or a dedicated rethreshing system (not shown).

A duct 50 is bounded by the sidewalls, the return pan 32, the clean grain trough 44, and tailings collection trough 46. The duct 50 serves as a channel for the cleaning airstream, which is generated at a front end by the fan 34 and exits at the rear outlet 42. The sieves 38, 39 are located in the duct 50.

Figure 3:
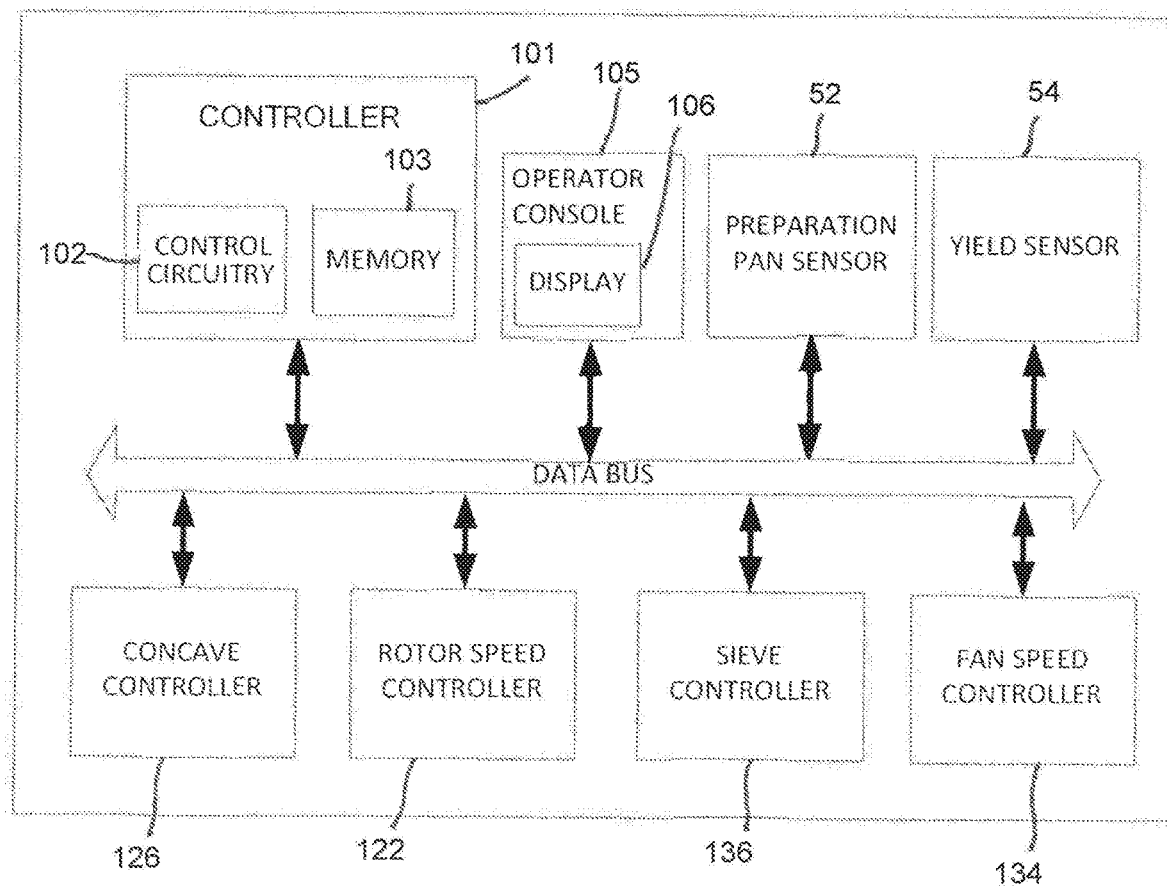
FIG. 3 is a block diagram of the grain cleaning system embodied in the combine harvester of FIG. 1.

With reference to FIG. 3, an electronic control unit (hereinafter termed 'ECU') 101 is provided and is in communication (via a databus) with an operator console 105, a concave controller 126, a rotor speed controller 122, a sieve controller 136, and the fan speed controller 134. The ECU 101 comprises control circuitry 102, which may be embodied as custom-made or commercially available processor, a central processing unit or an auxiliary processor among several processors, a semiconductor based micro-processor (in the form of a micro-chip), a macro processor, one or more applications specific integrated circuits, a plurality of suitably configured digital logic gates, and/or other well-known electrical configurations comprising discrete elements both individually and in various combinations to coordinate the overall operation of the combine 10.

The ECU 101 further comprises memory 103. The memory 103 may include any one of a combination of volatile memory elements and non-volatile memory elements. The memory 103 may store a native operating system, one or more native applications, emulation systems, emulated applications for any of a variety of operating systems and/or emulated hardware platforms, emulated operating systems etc. The memory 103 may be separate from the controller 101 or may be omitted.

The operator console 105 comprises a display 106, which may be integrated as part of a terminal having user interface devices such as buttons, levers, and switches. The console 105 is mounted proximate to a driver's work station in the cab 52.

The concave controller 126, rotor speed controller 122, sieve controller 136, and fan speed controller 134 each serve to control adjustments of respective working units of the combine 10 and may each comprise a local standalone processor and/or memory, or may be integrated into the central ECU 101. Control signals generated by the ECU 101 are communicated to the respective working unit controllers 126, 122, 136, 134 which are then translated into an adjustment of the associated working unit including the concave 26, processing rotor 22, sieves 38, 39, and fan 34.

A proximity sensor 52 may be mounted to the underside of the return pan 32 at a front end thereof. Due to the overlap between the front of the return pan 32 and the rear of the shoe preparation pan 28, the proximity sensor 52 is disposed directly above a portion of the shoe preparation pan 28.

The proximity sensor 52 is preferably an ultrasonic distance sensor that generates a first detection signal $S_1$ proportional to the volume of material present on the grain preparation pan immediately below the sensor 52. The proximity sensor is in wired or wireless communication with the ECU 101 via the databus.

Figure 5:
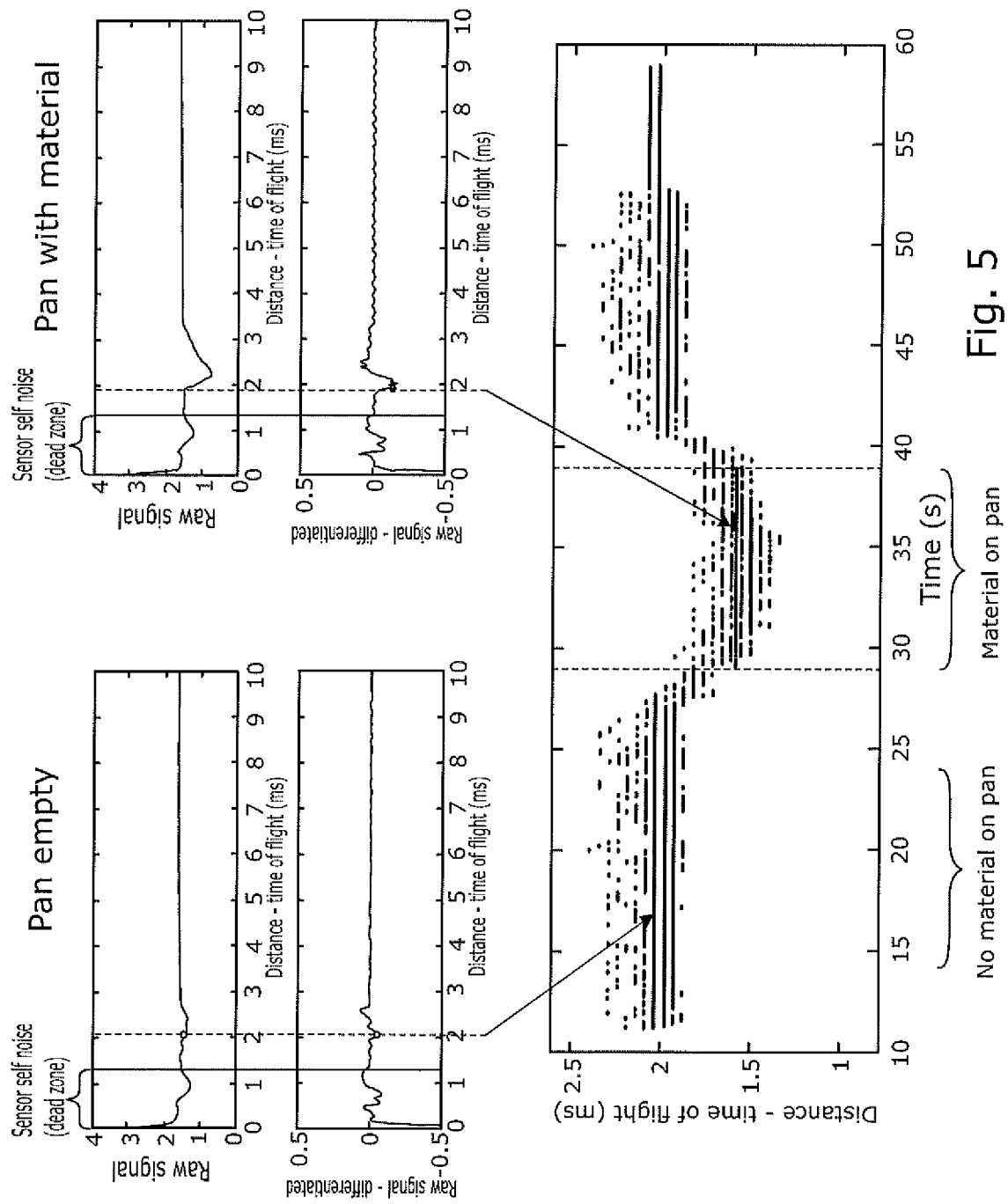
FIG. 5 is a plot of the 'flight time' of an ultrasonic proximity sensor above an empty preparation pan (left) and a loaded preparation pan (right).

With reference to FIGS. 2 and 5, the ultrasonic distance sensor may include a transmitter and a receiver. The transmitter is arranged to transmit a pulsed acoustic signal at a frequency of around 40 kHz to 300 kHz. The receiver (located proximate to the transmitter) receives a reflected portion of the pulsed transmitted signal. The duration between transmitting and receiving the signal is proportional to the distance between the sensor 52 and the top of the material layer 90 which reflects the signal.

FIG. 5 shows some experimental lab results, which indicate the reduction in 'time of flight' of the signal as material is added to the pan. This time of flight may provide a first detection signal $S_1$.

The ECU 101 is operable to determine from the first detection signal $S_1$ a representation of the material volume present on the shoe preparation pan 28, wherein the representation may be a material volume value which can be used as an input parameter for a fan speed control algorithm, for example.

The vast proportion of the material volume present at the 'point-of-delivery' on the rear of the shoe preparation pan 28 is made up of MOG. The volume of grain relative to MOG is relatively low. Therefore, a determination of the material volume present on the shoe preparation pan 28 can be used to estimate MOG feed rate of the cleaning system 30.

In one embodiment, the combine 10 also includes a yield sensor 54, which may be positioned in a variety of different locations. For example, the yield sensor 54 may detect a deflection of the elevator 19. Alternatively, the yield sensor 54 may detect a rate of material flow in the clean grain elevator. The yield sensor 54, if present, is in wired or wireless communication with the ECU 101 via the databus.

In determination of the material volume, a second detection signal $S_2$ from the yield sensor may serve as a further input to the ECU 101, wherein a material volume value is based upon both the first and second detection signals $S_1$, $S_2$. In this case, the inputs of the two detection signals can be weighted so that measurement from the proximity sensor is effectively validated or compensated with the knowledge of the grain or crop throughput.

Figure 4:
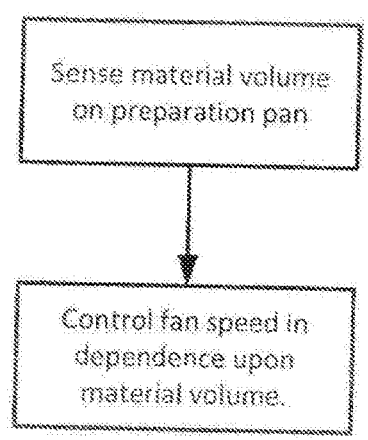
FIG. 4 is a process flow of a method of operating the combine harvester of FIG. 1.

The calculated material volume value is used by the ECU 101 as an input parameter for the generation of control signals that serve to command adjustments of the various working units 105, 122, 126, 134, 136 shown connected to the databus in FIG. 4. For example, in one embodiment, the material volume value is an input parameter for a fan speed control algorithm, which is executed locally by the fan speed controller 134 or the ECU 101, wherein the control algorithm operates the speed of fan 34 based upon a relationship with the measured material volume.

From reading the present disclosure, other modifications will be apparent to persons skilled in the art. Such modifications may involve other features which are already known in the field of grain cleaning systems, component parts, and automatic setting systems therefore, and which may be used instead of or in addition to features already described herein.

The invention claimed is:
1. A combine harvester comprising:
   a threshing apparatus;
   a separating apparatus;

a grain cleaning system located downstream of the separating apparatus; and
a material conveyance system arranged to convey crop material from the separating apparatus to the grain cleaning system, the material conveyance system comprising,
  a preparation pan disposed upstream of the screening apparatus and below the threshing apparatus;
  a return pan positioned below the separating apparatus and serving to catch crop material that falls from the separating apparatus and convey said material in a forward direction to a front edge of the return pan from where said material falls onto the preparation pan which is located below said front edge;
wherein the grain cleaning system comprises:
  a screening apparatus;
  a fan arranged to generate a cleaning airstream through the screening apparatus; and
  a fan control system comprising a proximity sensor mounted to an underside of the return pan and above the material conveyance system for sensing a material volume, wherein the proximity sensor is configured to generate a first detection signal that represents a sense material volume; and
a yield sensor in communication with the fan control system for sensing a grain material flow rate and configured to generate a second detection signal that represents a sensed grain material flow rate,
wherein the fan control system is configured to:
  receive the first detection signal and the second detection signal;
  weight the first detection signal and the second detection signal;
  determine a material volume value based at least partially on the weighted first detection signal and the weighted second detection signal; and
  control operation of the fan based at least partially on the determined material volume value.

2. The combine harvester of claim 1, wherein the proximity sensor is mounted above the preparation pan for sensing the material volume present on the preparation pan.

3. The combine harvester of claim 1, wherein the fan control system comprises a controller in communication with both of the proximity sensor and the yield sensor.

4. The combine harvester of claim 1, wherein the proximity sensor comprises an ultrasonic distance sensor.

5. A method of controlling a combine harvester which comprises a plurality of working units including threshing apparatus, separating apparatus, a grain cleaning system located downstream of the separating apparatus, and a material conveyance system arranged to convey crop material from the separating apparatus to the grain cleaning system, wherein the grain cleaning system comprises screening apparatus and a fan arranged to generate a cleaning airstream through the screening apparatus, the method comprising:
  sensing a material volume present on the material conveyance system;
  sensing a grain material flow rate on the material conveyance system;
  determining a material volume value based at least partially on the sensed material volume;
  validating the material volume value based at least partially on the sensed grain material flow rate; and
  controlling a speed of the fan based at least partially on the material volume value.

6. A combine harvester comprising:
a thresher;
a separator;
a grain cleaning system located downstream of the separator, wherein the grain cleaning system comprises:
  a screen;
  a fan arranged to generate a cleaning airstream through the screen; and
  a fan control system configured to control a fan speed; and
a material conveyance system arranged to convey crop material from the separator to the grain cleaning system, wherein the material conveyance system comprises:
  a preparation pan disposed upstream of the screen and below the thresher; and
  a return pan below the separator, wherein a front edge of the return pan is above the preparation pan, and wherein the return pan is configured to catch crop material that falls from the separator and convey the material forward and off the front edge of the return pan onto the preparation pan;
wherein the fan control system comprises a proximity sensor mounted to an underside of the return pan and above the preparation pan for sensing a material volume, and wherein the proximity sensor is configured to generate a first detection signal that represents a sensed material volume; and
a yield sensor in communication with the fan control system for sensing a grain material flow rate and configured to generate a second detection signal that represents a sensed grain material flow rate,
wherein the fan control system is configured to:
  receive the first detection signal and the second detection signal;
  determine a material volume value based at least partially on the first detection signal;
  validate the determined material volume value based at least partially on the second detection signal; and
  control operation of the fan based at least partially on the determined material volume value.

7. The combine harvester of claim 6, wherein the proximity sensor comprises an ultrasonic distance sensor.

8. The combine harvester of claim 6, wherein the fan control system is further configured to adjust the determined material volume value based at least partially on the second detection signal.

* * * * *